United States Patent
Tomo et al.

(10) Patent No.: US 11,982,583 B2
(45) Date of Patent: May 14, 2024

(54) DETECTION DEVICE AND SENSOR CALIBRATION METHOD

(71) Applicant: XELA Robotics Co., Ltd., Tokyo (JP)

(72) Inventors: Tito Pradhono Tomo, Tokyo (JP); Alexander Schmitz, Tokyo (JP); Sophon Somlor, Tokyo (JP); Shigeki Sugano, Tokyo (JP)

(73) Assignee: XELA Robotics Co., Ltd., Tokyo (JP)

( * ) Notice: Subject to any disclaimer, the term of this patent is extended or adjusted under 35 U.S.C. 154(b) by 413 days.

(21) Appl. No.: 17/429,740

(22) PCT Filed: Jan. 31, 2020

(86) PCT No.: PCT/JP2020/003825
§ 371 (c)(1),
(2) Date: Aug. 10, 2021

(87) PCT Pub. No.: WO2020/170770
PCT Pub. Date: Aug. 27, 2020

(65) Prior Publication Data
US 2022/0120630 A1    Apr. 21, 2022

(30) Foreign Application Priority Data
Feb. 18, 2019    (JP) .................... 2019-026954

(51) Int. Cl.
*G01L 25/00*    (2006.01)
*G01L 1/12*    (2006.01)
*G01L 5/22*    (2006.01)

(52) U.S. Cl.
CPC ............ *G01L 25/00* (2013.01); *G01L 1/12* (2013.01); *G01L 5/226* (2013.01)

(58) Field of Classification Search
CPC ............ G01L 25/00; G01L 1/12; G01L 5/226
See application file for complete search history.

(56) References Cited

U.S. PATENT DOCUMENTS

| | | |
|---|---|---|
| 4,094,192 A | 6/1978 | Watson et al. |
| 4,620,436 A | 11/1986 | Hirabayashi et al. |
| | (Continued) | |

FOREIGN PATENT DOCUMENTS

| | | |
|---|---|---|
| JP | 61-278728 A | 12/1986 |
| JP | 63-109344 A | 5/1988 |
| | (Continued) | |

OTHER PUBLICATIONS

International Search Report dated Mar. 3, 2020, issued in counterpart application No. PCT/JP2020/003825 (2 pages).

*Primary Examiner* — Eric S. McCall
*Assistant Examiner* — Timothy P Graves
(74) *Attorney, Agent, or Firm* — WHDA, LLP

(57) ABSTRACT

A detection device 12 according to the present invention is provided with a calibration means 14 that specifies a relational expression between an output value from a force sensor 11 when an external force is applied and the magnitude of the external force. The relational expression contains a formula that includes a predetermined parameter and with which it is possible to calculate, according to an offset value obtained as the output value when the sensor is free of contact and not acted upon by the external force, the magnitude of the external force from the actual output value. The calibration means 14 is provided with a function derivation unit 17 that derives a function for calculating the parameter value from the offset value, and a parameter value determination unit 18 that uses the function to determine the parameter value. The function derivation unit 17 generates the function from the output value when a known external force is applied and an offset value from a preceding step, and the parameter value determination unit 18 calculates the parameter value from the offset value acquired in a state in (Continued)

which the force sensor 11 is disposed on a predetermined site where the external force is to be measured.

6 Claims, 2 Drawing Sheets

(56) References Cited

U.S. PATENT DOCUMENTS

| | | | |
|---|---|---|---|
| 5,092,154 A * | 3/1992 | Eldridge | G01L 5/0033 73/1.15 |
| 9,778,132 B1 | 10/2017 | Urata et al. | |
| 2002/0011092 A1 | 1/2002 | Hara et al. | |

FOREIGN PATENT DOCUMENTS

| | | |
|---|---|---|
| JP | 11-237296 A | 8/1999 |
| JP | 2011-112414 A | 6/2011 |

* cited by examiner

DETECTION DEVICE AND SENSOR CALIBRATION METHOD

TECHNICAL FIELD

The present invention relates to a detection device and a sensor calibration method, and more particularly, to a detection device and a sensor calibration method that convert an output value from a sensor when a predetermined external force is applied to detect a physical quantity such as the magnitude of the external force or a displacement in response to the external force, and associate the physical quantity with the output value.

BACKGROUND ART

Robots that perform predetermined work while coexisting with humans are provided with various sensors for when a person or object present in the environment around the robot contacts the robot, such as tactile sensors that detect external forces such as pressing force and shear force acting on the contacted portion, and the motion of the robot is controlled on the basis of detected values from various sensors including the tactile sensors. A known example of a tactile sensor is a magnetic tactile sensor using changes in a magnetic field due to the action of an external force. The magnetic tactile sensor is provided with an elastic body having a surface on which the external force acts, a magnet secured inside the elastic body, and a magnetic sensor that detects the state of a magnetic field generated by the magnet.

To control the motion of the robot precisely, it is necessary to dispose many tactile sensors regularly on the surface of the robot and acquire a detected value from each tactile sensor, but the tactile sensors themselves are insufficient for ascertaining the magnitude of an actually acting external force from an obtained electrical signal. Consequently, calibration work is necessary, in which an external force of known magnitude is made to act on the tactile sensors in an initial state before use, and the relationship between the output values corresponding to the electrical signal obtained at the time and the magnitude of the external force is calculated. During this work, calibration is performed by using a testing device like the one described in Patent Literature 1 for example to apply a known external force to the tactile sensors in six directions including force components in three orthogonal axis direction and moment components about the three axes.

CITATION LIST

Patent Literature

Patent Literature 1: Japanese Laid-Open No. 2011-112414

SUMMARY OF INVENTION

Technical Problem

With the magnetic tactile sensor described above, slight inconsistencies in the position of the magnet attached inside the elastic body may occur among the same products. Consequently, to raise the accuracy of measuring the external force acting on the robot, it is necessary to calibrate each of the many tactile sensors attached to the robot, and the extremely time-consuming nature of the calibration work is inconvenient. As another example, in the case of disposing a tactile sensor at a predetermined spot on a curved surface, such as a fingertip of the robot, there is a possibility that the position of the magnet in the no-load state when an external force is not acting on the elastic body may be displaced due to slight deformations or the like in the elastic body due to the placement. Consequently, to raise the accuracy of measuring the external force, it is necessary to calibrate each and every tactile sensor disposed at a predetermined spot in a state with the tactile sensors disposed at the predetermined spot. However, there are problems with using the testing device in Patent Literature 1, namely in that the tactile sensor must be placed on a flat stage, setting a tactile sensor actually disposed at a predetermined spot in the testing device is difficult, the calibration work is time-consuming, and moreover, depending on the disposed state of the tactile sensor, it may not be possible to set the tactile sensor in the testing device. For these reasons, in the case of disposing many tactile sensors at different attitudes in this way, the cumbersome calibration work hitherto has been inconvenient.

The present invention was contrived by focusing on the above issues, and an objective is to provide a detection device and a sensor calibration method with which the calibration work for each sensor can be performed quickly and accurately, even in cases where many sensors that detect a physical quantity associated with the action of an external force, such as tactile sensors, are disposed on predetermined sites having different surface shapes.

Solution to Problem

To achieve the above objective, the present invention mainly adopts a configuration of a detection device that uses a relational expression between an output value from a sensor when a predetermined external force is applied and a physical quantity associated with the action of the external force to detect a measured value of the physical quantity from the output value, comprising: a calibration means that specifies the relational expression during a calibration that associates the output value with the physical quantity, wherein the relational expression comprises a formula that includes a predetermined parameter and with which it is possible to calculate, according to an offset value obtained as the output value from the sensor when the sensor is free of contact and not acted upon by the external force, the physical quantity from the output value, the calibration means comprises a function derivation unit that derives a function for calculating a parameter value, that is, a determined value of the parameter, from the offset value, and a parameter value determination unit that determines the parameter value from the function, the function derivation unit generates the function from the output value obtained when a known external force of predetermined magnitude is applied and the offset value acquired in a preceding step, and the parameter value determination unit uses the function to calculate the parameter value from the offset value acquired in a state in which the sensor is disposed on a predetermined site where the external force is to be measured.

Also, the present invention adopts a sensor calibration method that associates an output value from a sensor when a predetermined external force is applied with a physical quantity associated with the action of the external force, comprising: when determining a relational expression comprising a formula that includes a predetermined parameter and with which it is possible to calculate, according to an offset value obtained as the output value from the sensor when the sensor is free of contact and not acted upon by the external force, the physical quantity from the output value, successively performing a first step of deriving a function expressing a relationship between the parameter value and the offset value from the output value obtained when a known external force of predetermined magnitude is applied to the sensor and the offset value measured in advance, and a second step of measuring the offset value again before measuring the physical quantity, and using the function to calculate the parameter value from the offset value.

Advantageous Effects of Invention

According to the present invention, first, by applying a known external force to a sensor, an offset value obtained as the output value of the sensor in a no-load state is used to determine a function of a parameter value and the offset value forming a relational expression that expresses the relationship between the output value from the sensor and the physical quantity associated with the action of the external force. Thereafter, by measuring the offset value again in a state with the sensor disposed on a predetermined site having a curved surface, the parameter value is determined and the relational expression is specified. Additionally, the physical quantity is detected from the output value from the sensor according to the specified relational expression. Consequently, the preliminary work of applying a known force is only performed enough times to determine the function, and does not need to be performed on all of the many sensors disposed on the predetermined site. Also, after disposing the sensors on the predetermined site, the parameter value for each sensor is calculated from the function by simply measuring the offset value of each of all of the sensors, and the relational expression for each sensor is specified automatically. The above makes it possible to perform the calibration work for each sensor quickly and accurately, even in cases where many sensors are disposed on predetermined sites having different surface shapes.

DESCRIPTION OF EMBODIMENT

Hereinafter, an embodiment of the present invention will be described with reference to the drawings.

Figure 1:
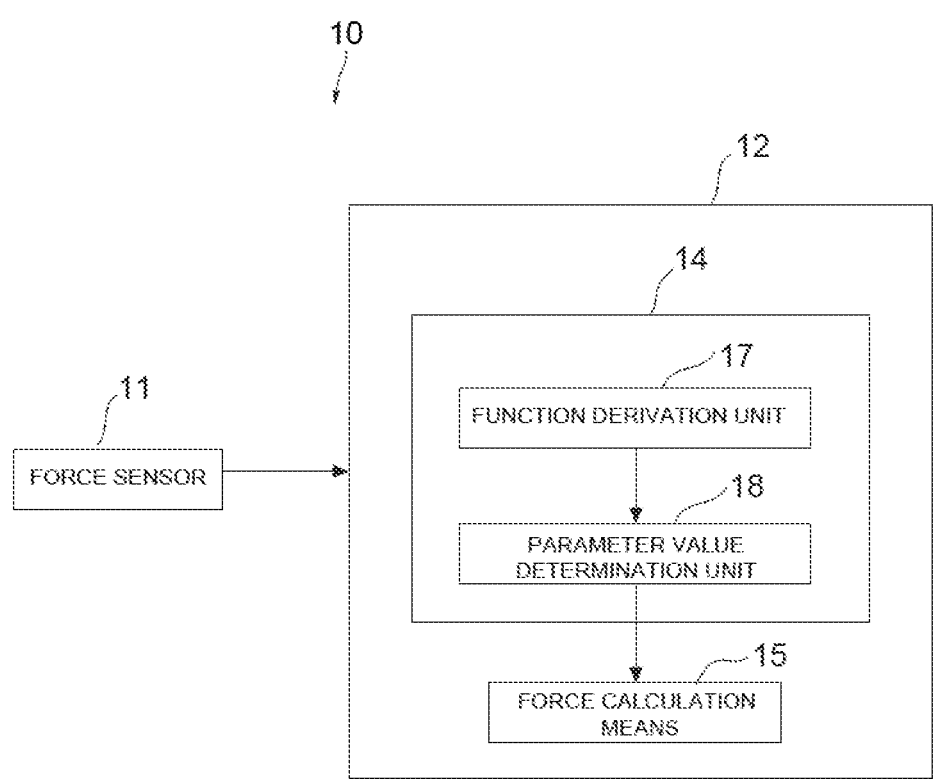
FIG. 1 is a block diagram illustrating a schematic configuration of a force measurement system including a detection device according to the present invention.

FIG. 1 is a block diagram illustrating a schematic configuration of a force measurement system including a detection device according to the present invention. In this diagram, the force measurement system 10 includes a force sensor 11 (sensor) that outputs an electrical signal corresponding to the magnitude of an acting external force, and a detection device 12 that detects a measured value of the external force by converting the output value from the force sensor 11 into a magnitude of the external force.

Figure 2:
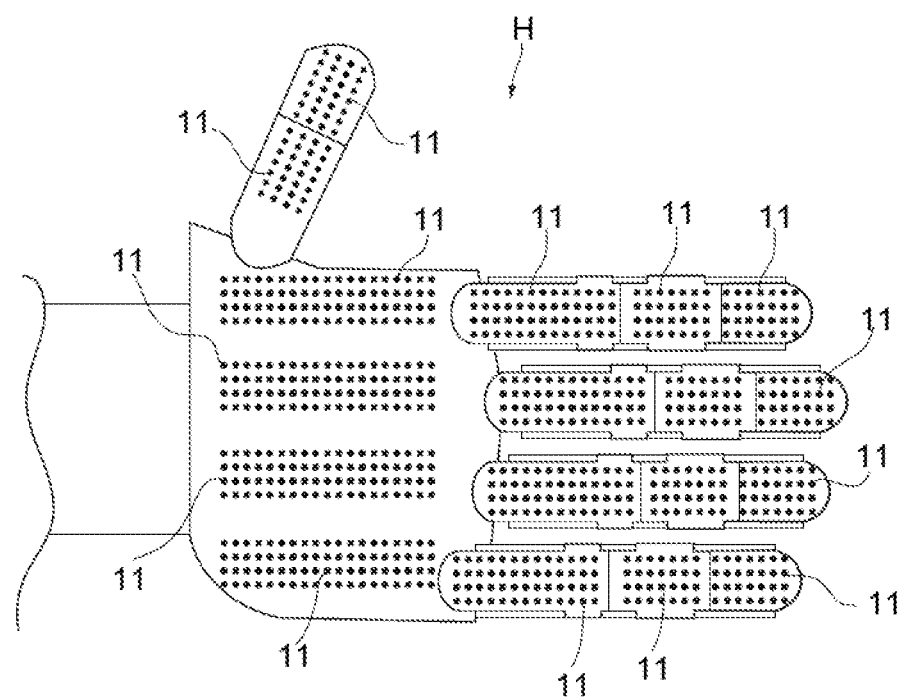
FIG. 2 is a schematic diagram of a robot hand with force sensors disposed on the surface thereof.

The force sensor 11 in the present embodiment is not particularly limited, but a magnetic tactile sensor using changes in a magnetic field in response to the action of an external force is used, and as exemplified in FIG. 2, a plurality of tactile sensors with the same specifications are disposed regularly on the surface of the palm side of a robot hand H.

Although omitted from illustration, the force sensor 11 has a known structure in which, when an external force is applied to a flexible elastic body internally provided with a magnet, a change in the magnetic field due to the displacement of the magnet in association with the deformation of the elastic body is detected by a magnetic detection element, and an electrical signal corresponding to the magnitude of the magnetic field is treated as an output value. In the force sensor 11, output values from the magnetic detection element in three predetermined orthogonal axis directions with reference to the sensor are acquirable according to the magnitude of the acting external force. Note that in the present embodiment, the output directions of the magnetic detection element are not limited to three orthogonal axis directions, and the method described later is applicable to output values in one or more axis directions.

The detection device 12 includes a predetermined processing circuit and a computer, and is provided with a calibration means 14 that determines a relational expression between the magnitude of an external force acting on the force sensor 11 and an output value from the force sensor 11 when performing calibration to associate the above values, and a force calculation means 15 that uses the relational expression to calculate the magnitude of the external force acting on the force sensor 11 from the output value from the force sensor 11 during actual use of the force sensor 11.

Here, the following formulas that include predetermined parameters and can be used to calculate, according to an offset value obtained as the output value when the force sensor 11 is free of contact in a no-load state in which the external force is not acting, the magnitude of an external force from the output value of the force sensor 11 may be illustrated as an example of the relational expression.

[Math. 1]

$$Fx(t)=a1 \cdot S1d(t)+a2 \cdot S2d(t)+a3 \cdot S3d(t) \ Fy(t)=b1 \cdot S1d(t)+b2 \cdot S2d(t)+b3 \cdot S3d(t) \ Fz(t)=c1 \cdot S1d(t)+c2 \cdot S2d(t)+c3 \cdot S3d(t) \quad (1)$$

$$S1d(t)=S1(t)-d1 \ S2d(t)=S2(t)-d2 \ S3d(t)=S3(t)-d3 \quad (2)$$

In the above expressions, $Fx(t)$, $Fy(t)$, and $Fz(t)$ represent the external force applied in each of three predetermined orthogonal axis (x-axis, y-axis, z-axis) directions at a time t. Also, $S1(t)$, $S2(t)$, and $S3(t)$ represent the output values from the magnetic detection element in the three orthogonal axis directions of the force sensor 11 at the time t. Furthermore, a1, a2, a3, b1, b2, b3, c1, c2, and c3 (hereinafter simply denoted "a*, b*, c*") represent parameter values, which are determined values of parameters in the relational expression. Also, d1, d2, and d3 represent the offset values of the magnetic detection element in the three orthogonal axis directions.

The calibration means 14 is provided with a function derivation unit 17 that derives a function for calculating the parameter values from the offset values, and a parameter value determination unit 18 that determines the parameter values from the function.

Note that Expression (1) is applicable to the case of a linear relationship between the force acting on the force sensor 11 and the output value from the force sensor 11. In the case where the relationship is nonlinear, a polynomial expression or the like may be used instead of Expression (1) for example, and the problem may be treated as a nonlinear regression problem.

In the function derivation unit 17, the function is derived as follows.

First, the force sensor 11 is placed in an attitude corresponding to the attitude (disposed attitude) on the predetermined site where the force sensor 11 is to be disposed, put into a no-load state in which no external force acts on the force sensor 11, a plurality of output values are acquired in this state at fixed time intervals, and the average of these values is treated as the offset value. The offset value is calculated for each of the three orthogonal axis directions.

Next, the force sensor 11 in the above attitude is subjected to an external force $Fx(t_0)$, $Fy(t_0)$, $Fz(t_0)$ of known magnitude in each of the three orthogonal axis directions, and measured values from the force sensor 11 at the time $t_0$, namely output values $S1(t_0)$, $S2(t_0)$, $S3(t_0)$ from the magnetic detection element in the three axis directions, are obtained.

Additionally, from the calculated offset values d1, d2, d3, the external forces $Fx(t_0)$, $Fy(t_0)$, $Fz(t_0)$ of known magnitude, and the output values $S1(t_0)$, $S2(t_0)$, $S3(t_0)$ at the time, equations treating the parameter values a*, b*, and c* as variables are specified according to Expression (1). Furthermore, the equations are specified according to a similar procedure for each of the other force sensors 11 of the same type having similar specifications. From the equations obtained for the plurality of force sensors 11, a technique such as machine learning, curve fitting, or the finite element method is used to derive functions f1 to f9 of the parameter values a*, b*, and the offset values d1, d2, d3 as illustrated in the following Expression (3).

[Math. 2]

$$a1=f1(d2,d3)\ a2=f2(d2,d3)\ a3=f3(d2,d3)\ b1=f4(d2,d3)\ b2=f5(d2,d3)\ b3=f6(d2,d3)\ c1=f7(d2,d3)\ c2=f8(d2,d3)\ c3=f9(d1,d2,d3) \quad (3)$$

In the parameter value determination unit 18, the parameter values a*, b*, are determined as follows. Namely, when using the force sensors 11 for the first time after attaching all of the force sensors 11 to the robot hand H, an initial measurement for calculating the offset values d1, d2, d3 is performed similarly as described above for each force sensor 11 in a no-load state in which each force sensor 11 is free of contact and not being acted upon by an external force. Thereafter, the parameter values a*, b*, are calculated from the offset values d1, d2, d3 obtained for each force sensor 11 according to Expression (3) above, and the relational expression in Expression (1) is determined for each force sensor 11.

In the force calculation means 15, the output values from each force sensor 11 are substituted into the corresponding relational expression specified by each force sensor 11 by the calibration means 14 to thereby calculate the magnitude in the three axis directions for each force sensor 11 and ascertain the distribution and direction of the externa force acting upon the palm surface of the robot hand H. Namely, at this point, Expressions (1) and (2) above are used to calculate the magnitude $Fx(t)$, $Fy(t)$, $Fz(t)$ of the external force in the three axis directions at the time t from the offset values d1, d2, d3 already acquired by the parameter value determination unit 18 and the output values $S1(t)$, $S2(t)$, $S3(t)$ measured at the time t.

Next, a force detection procedure including a calibration procedure using the detection device 12 will be described.

First, a function expressing the relationship between the parameter values and the offset values is derived (first step).

At this point, first, a plurality of (for example, approximately 10) force sensors 11 of the same type are prepared as the force sensors 11 before being attached to the robot hand H, and each force sensor 11 is put into a state (first installed state) of being installed at an attitude corresponding to the disposed attitude at a different position from the predetermined site where the force sensor 11 is to be installed. Moreover, as a preceding step, output values are measured several times within a predetermined time under a no-load state in which no external force is acting upon the force sensor 11, and the average of the output values is specified as an offset value. Thereafter, while maintaining the first installed state, each force sensor 11 for which an offset value has been calculated is subjected to a known external force having a magnitude determined in advance, and the output value in this case is measured. Additionally, by substituting the offset values and the external force into Expressions (1) and (2) above and performs a process such as machine learning, curve fitting, or the finite element method on the values obtained by the equations existing for each force sensor 11, functions of the offset values and the parameter values (Expression (3) above) are determined.

Thereafter, all of the force sensors 11 are attached to predetermined sites on the robot hand H, and automatic calibration is performed next (second step).

In other words, first, for each and every force sensor 11 in the state of being installed on the robot hand H (second installed state), output values are measured several times within a predetermined time under a no-load state in which no external force is acting upon the force sensor 11, and the average of the measured values is specified as an offset value. Additionally, the functions for each force sensor 11 grouped according to attitude are used to specify the parameter values of the each force sensor 11 from the offset values obtained for the corresponding force sensor 11, and the relational expression is determined for each force sensor 11.

After the above calibration work ends, when an external force acts upon the force sensors 11, the relational expression corresponding to each force sensor 11 is used to calculate the magnitude of the external force from the acquired output value for each force sensor 11.

Consequently, according to such an embodiment, even in cases where many force sensors 11 are disposed on the curved portions of the robot hand H, the force sensors 11 installed at the same attitude can be calibrated as a group, and calibration work for all of the force sensors 11 is unnecessary.

Note that the relational expression described above is not limited to Expression (1), and may be any formula obtained on the basis of prior experiment or the like such that the external force $Fx(t)$, $Fy(t)$, $Fz(t)$ acting on a force sensor 11 can be calculated by subtracting the offset values d1, d2, d3 from the output values $S1(t)$, $S2(t)$, $S3(t)$, and then multiplying the resulting value by the parameters a*, b*, c*.

Furthermore, the above describes an example in which only the external force $Fx(t_0)$, $Fy(t_0)$, $Fz(t_0)$ of known magnitude at the time $t_0$ and the output values $S1(t_0)$, $S2(t_0)$, $S3(t_0)$ obtained at the time are used when determining the parameter values a*, b*, c*, but external forces $\{Fx(t_1), \ldots, Fx(t_n)\}$, $\{Fy(t_1), \ldots, Fy(t_n)\}$, $\{Fz(t_1), \ldots, Fz(t_n)\}$ with a plurality of different magnitudes at a plurality of times $\{t_1, \ldots, t_n\}$ may be applied, and the plurality of output values $\{S1(t_1), \ldots, S1(t_n)\}$, $\{S2(t_1), \ldots, S2(t_n)\}$, $\{S3(t_1), \ldots, S3(t_n)\}$ obtained at these times may be used to calculate the parameter values a*, b*, by using the least squares method, for example.

Additionally, a function that accounts for temperature compensation may also be adopted as the above function. Namely, temperature information about the temperature near each force sensor 11 may be made measurable with a temperature sensor, and the function derivation unit 17 may generate a function that treats the temperature and the offset value as a variable to specify the parameter value from the result of acquiring the temperature information. In this case, the first step above is performed in an environment for which temperature information has been acquired, and thereafter, temperature information is acquired when the second step above is performed, the temperature information is additionally used to specify the relational expression from the function, and the external force is measured by the force sensor 11 at the same temperature immediately afterward. In this case, a mathematical model of multiple regression analysis treating the temperature information and the external force as two explanatory variables can be used as Expression (1).

Furthermore, although the present embodiment illustrates and describes a case of dealing with a magnetic tactile sensor, the present invention is not limited thereto, and is applicable to force sensors in general, including other types of tactile sensors such as piezoelectric sensors and strain gauges, kinesthetic sensors, and pressure sensors.

Additionally, besides force sensors, the present invention is also applicable to the calibration of displacement sensors that detect the displacement of a site acted upon by an external force as a physical quantity associated with the action of the external force.

Otherwise, the configuration of each component of the devices in the present invention is not limited to the illustrated configuration examples, and various modifications are possible insofar as substantially the same effects are exhibited.

REFERENCE SIGNS LIST

10 force measurement system
11 force sensor (sensor)
12 detection device
14 calibration means
17 function derivation unit
18 parameter value determination unit

The invention claimed is:

1. A detection device comprising:
at least one of a circuit and a processor receiving an output value from a sensor and outputting a measured value of a physical quantity associated with an action of an external force applied to the sensor, the at least one of a circuit and the processor being configured to:
calibrate the output value from the sensor to output the measured value by specifying and using a relational expression that associates the output value with the physical quantity, the relational expression including a formula that has a predetermined parameter, the relational expression being used to calculate, according to an offset value, the physical quantity from the output value, the offset value being an average of a plurality of the output values acquired at fixed time intervals when the sensor is free of contact;
derive a function for calculating a parameter value for the predetermined parameter from the offset value, the function being generated from the output value obtained when a known external force of predetermined magnitude is applied to the sensor and the offset value having been acquired in a preceding step; and
determining the parameter value using the function to calculate the parameter value from another offset value acquired in a state in which the sensor is disposed on a predetermined site where the external force is to be measured.

2. The detection device according to claim 1, wherein the relational expression is a formula that calculates the physical quantity on a basis of a value obtained by subtracting the offset value from the output value and then multiplying by the parameter value.

3. The detection device according to claim 1, wherein the function is generated by processing data obtained from sensors of the same type.

4. The detection device according to claim 1,
wherein the function additionally incorporates temperature information about the temperature near the sensor to calculate the parameter value from the offset value and the temperature information, and
the determining of the parameter value uses the function to calculate the parameter value from the another offset value and the temperature information acquired in a state in which the sensor is disposed on a predetermined site where the physical quantity is to be measured.

5. A sensor calibration method comprising:
calibrating a sensor using a relational expression that associates an output value output from the sensor with a physical quantity associated with an action of an external force applied to the sensor, the relational expression including a formula that has a predetermined parameter, the relational expression being used to calculate, according to an offset value acquired from the output value from the sensor when the sensor is free of contact and not acted upon by the external force, the physical quantity from the output value; and
when determining the relational expression, successively performing
a first step of deriving a function expressing a relationship between a parameter value for the predetermined parameter and the offset value obtained from the output value when a known external force of predetermined magnitude is applied to the sensor and the offset value having been acquired in advance, and
a second step of acquiring another offset value before measuring the physical quantity, and using the function to calculate the parameter value from the another offset value.

6. The sensor calibration method according to claim 5, wherein
in the first step, the external force is applied in a state in which the sensor is installed at a predetermined attitude at a different position from a predetermined site where the physical quantity is to be measured, and
in the second step, the another offset value is acquired in a state in which the sensor is disposed on the predetermined site.

* * * * *